US012643148B2

(12) United States Patent

Kimura et al.

(10) Patent No.: US 12,643,148 B2
(45) Date of Patent: Jun. 2, 2026

(54) METHOD FOR MANUFACTURING THREE-DIMENSIONAL OBJECT, THREE-DIMENSIONAL OBJECT, TITANIUM-CONTAINING INTERMEDIATE THREE-DIMENSIONAL OBJECT, AND TITANIUM-CONTAINING THREE-DIMENSIONAL OBJECT

(71) Applicant: NIPPON PISTON RING CO., LTD., Saitama (JP)

(72) Inventors: Masahiro Kimura, Saitama (JP); Yusuke Tachibana, Saitama (JP); Atsushi Yamamoto, Saitama (JP)

(73) Assignee: NIPPON PISTON RING CO., LTD. (JP)

( * ) Notice: Subject to any disclaimer, the term of this patent is extended or adjusted under 35 U.S.C. 154(b) by 186 days.

(21) Appl. No.: 18/341,292

(22) Filed: Jun. 26, 2023

(65) Prior Publication Data

US 2024/0001442 A1 Jan. 4, 2024

(30) Foreign Application Priority Data

Jun. 29, 2022 (JP) ................................. 2022-104271
Jun. 26, 2023 (JP) ................................. 2023-104086

(51) Int. Cl.
B22F 10/14 (2021.01)
B22F 3/10 (2006.01)
(Continued)

(52) U.S. Cl.
CPC ........... B22F 10/14 (2021.01); B22F 3/1007 (2013.01); B22F 10/32 (2021.01); B22F 10/68 (2021.01);
(Continued)

(58) Field of Classification Search
None
See application file for complete search history.

(56) References Cited

U.S. PATENT DOCUMENTS 10,525,530 B2 1/2020 Amaya et al.
10,850,493 B2 * 12/2020 Orange ................... B22F 10/32
(Continued)

FOREIGN PATENT DOCUMENTS

CN 105215359 A 1/2016
CN 109420767 A 3/2019
(Continued)

OTHER PUBLICATIONS

Office Action issued in the corresponding Chinese Patent Application No. 202310780736.4; issued Sep. 15, 2025 (total 23 pages).
(Continued)

*Primary Examiner* — Daniel J. Schleis
(74) *Attorney, Agent, or Firm* — Harness, Dickey & Pierce, P.L.C.

(57) ABSTRACT

A method for manufacturing a three-dimensional object includes: a modeling step of modeling an intermediate object by applying a binding fluid to a metal powder containing titanium; and a sintering step of sintering the intermediate object to produce a three-dimensional object. The modeling step is performed in a vacuum or inert gas atmosphere. When the modeling step is performed in a modeling area and the method includes a curing step of curing the binding fluid included in the intermediate object in a curing area different from the modeling area after the modeling step and before the sintering step, the curing step is performed in a vacuum or inert gas atmosphere. A moving path for moving the intermediate object having gone through the modeling step from the modeling area to the curing area is in a vacuum or inert gas atmosphere.

5 Claims, 7 Drawing Sheets

(51) Int. Cl.

| | | |
|---|---|---|
| *B22F 10/32* | (2021.01) | |
| *B22F 10/68* | (2021.01) | |
| *B29C 64/165* | (2017.01) | |
| *B33Y 10/00* | (2015.01) | |
| *B33Y 40/20* | (2020.01) | |
| *B33Y 70/00* | (2020.01) | |

(52) U.S. Cl.

CPC ............ *B29C 64/165* (2017.08); *B33Y 10/00* (2014.12); *B33Y 40/20* (2020.01); *B22F 3/10* (2013.01); *B22F 2201/10* (2013.01); *B22F 2201/20* (2013.01); *B22F 2301/205* (2013.01); *B33Y 70/00* (2014.12)

(56) References Cited

U.S. PATENT DOCUMENTS

| | | | |
|---|---|---|---|
| 11,179,777 | B2 | 11/2021 | Koike et al. |
| 11,760,009 | B2 | 9/2023 | Tsunoya |
| 12,157,169 | B2 | 12/2024 | Conlon et al. |
| 2016/0236422 | A1 | 8/2016 | Sakura |
| 2016/0325356 | A1 | 11/2016 | Hirata et al. |
| 2017/0252851 | A1 | 9/2017 | Fulop et al. |
| 2018/0291511 | A1 | 10/2018 | Katogi et al. |
| 2018/0311728 | A1 | 11/2018 | Kottilingam et al. |
| 2018/0326491 | A1 | 11/2018 | Koike et al. |
| 2019/0024217 | A1 | 1/2019 | Yolton et al. |
| 2019/0070662 | A1 | 3/2019 | Amaya et al. |
| 2019/0255608 | A1 | 8/2019 | Godfrey et al. |
| 2020/0261974 | A1 | 8/2020 | Tsunoya |
| 2021/0086266 | A1 | 3/2021 | Black et al. |
| 2024/0424572 | A1* | 12/2024 | Hudelson .............. B33Y 40/20 |

FOREIGN PATENT DOCUMENTS

| | | | | |
|---|---|---|---|---|
| CN | 111590067 | A | | 8/2020 |
| JP | 2016-153212 | A | | 8/2016 |
| JP | 2017-057427 | A | | 3/2017 |
| JP | 6227206 | B1 | | 11/2017 |
| JP | 2018196968 | A | | 12/2018 |
| JP | 2019-011506 | A | | 1/2019 |
| JP | 2019-522105 | A | | 8/2019 |
| JP | 2020-529516 | A | | 10/2020 |
| JP | 2020-192742 | A | | 12/2020 |
| JP | 2021146669 | A | * | 9/2021 |
| KR | 2020-0021097 | A | | 2/2020 |
| WO | 2020-014055 | A1 | | 1/2020 |
| WO | 2020-237359 | A1 | | 12/2020 |

OTHER PUBLICATIONS

Office Action issued in the corresponding Japanese Patent Application No. 2023-104086; mailed Oct. 21, 2025 (total 11 pages).
Office Action issued in the corresponding Chinese Patent Application No. 202310780736.4; issued Apr. 1, 2026 (total 15 pages).

\* cited by examiner

100

200

FIG.3A
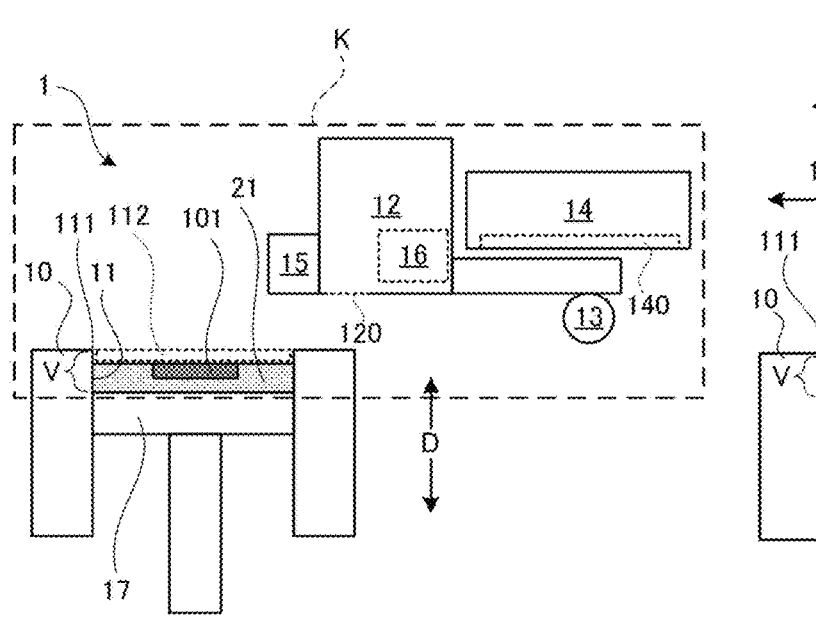
FIG.3B
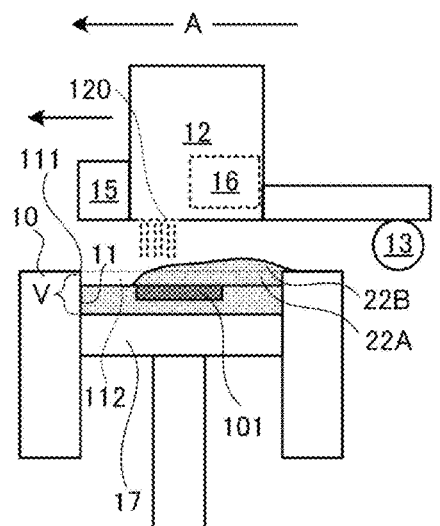
FIG.3C
FIG.3D
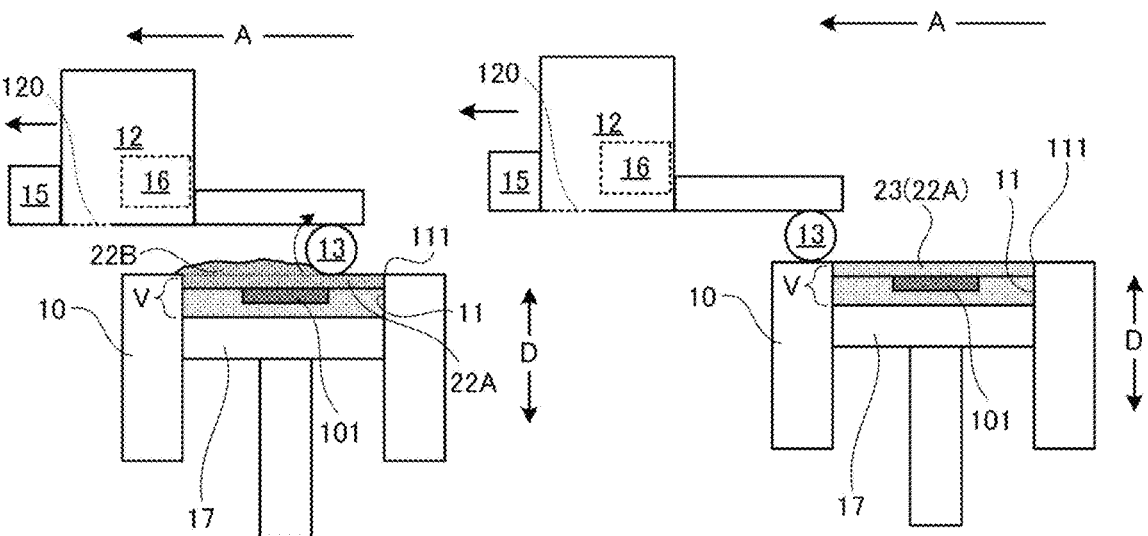

FIG.4A
FIG.4B
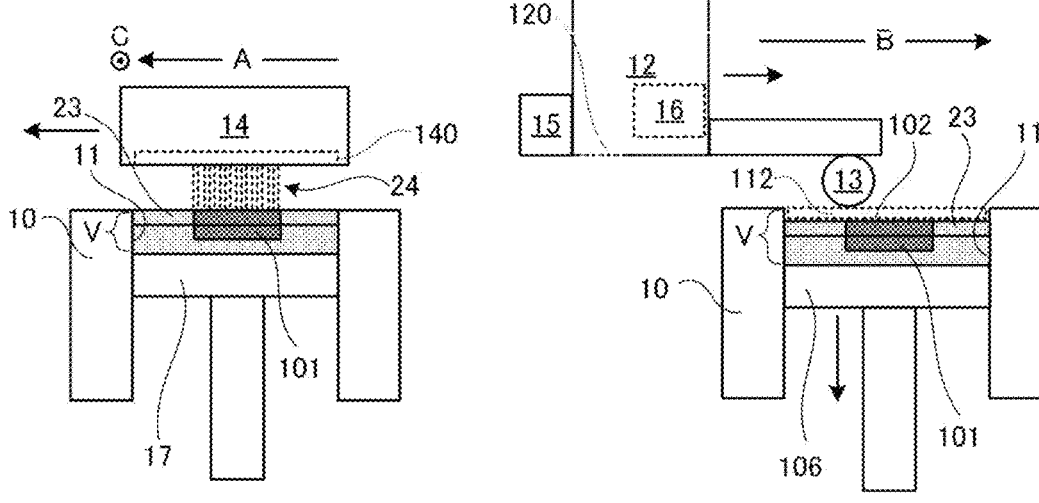
FIG.4C
FIG.4D
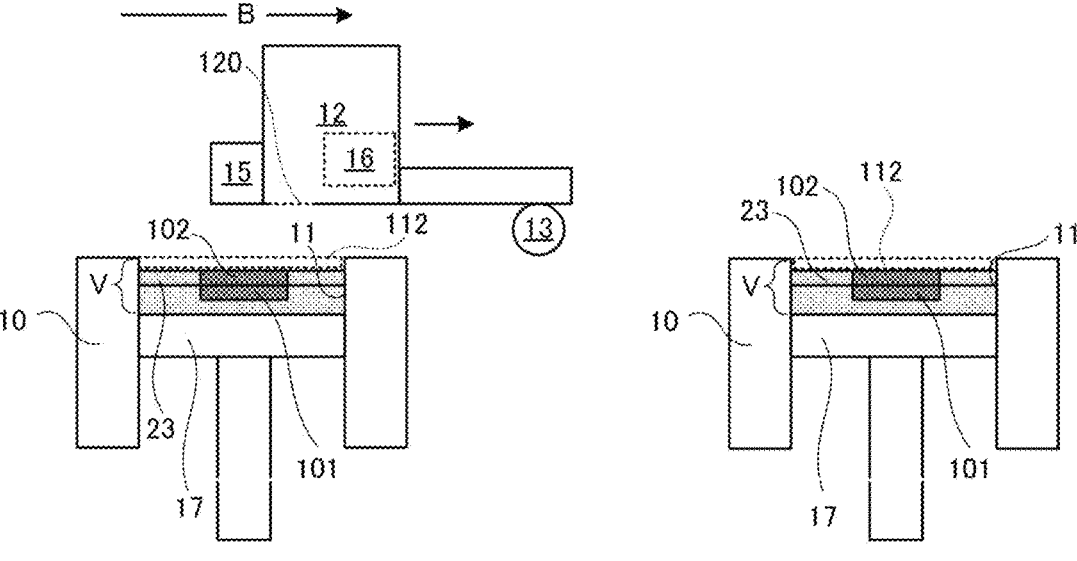

METHOD FOR MANUFACTURING THREE-DIMENSIONAL OBJECT, THREE-DIMENSIONAL OBJECT, TITANIUM-CONTAINING INTERMEDIATE THREE-DIMENSIONAL OBJECT, AND TITANIUM-CONTAINING THREE-DIMENSIONAL OBJECT

CROSS REFERENCE TO RELATED APPLICATIONS

The present application is based on, and claims priority from JP Application Serial Number 2022-104271, filed Jun. 29, 2022, and JP Application Serial Number 2023-104086, filed Jun. 26, 2023, the disclosures of which are hereby incorporated by reference herein in their entireties.

BACKGROUND

Technical Field

The present invention relates to a method for manufacturing a three-dimensional object, a three-dimensional object, a titanium-containing intermediate three-dimensional object, and a titanium-containing three-dimensional object.

Related Art

Binder jetting (BJT) has been attracting attention in recent years as a method for modeling a three-dimensional object. In binder jetting, a powder layer is formed by supplying powder to the entirety of a flat area and then leveling the powder using a recoater, for example. Based on two-dimensional image data (slice data) on a desired three-dimensional object, a liquid (binder) is then applied to a partial area of the powder layer corresponding to the slice data to solidify the powder. The formation of the powder layer and the partial solidification by the application of the liquid are repeated to form the three-dimensional object (see Japanese Patent Application Laid-Open No. 2018-196968).

At present, manufacturing of a three-dimensional object by the foregoing binder jetting using a metal powder containing titanium is rarely practiced.

In view of the circumstances, an object of the present invention is to provide a manufacturing method that can model a three-dimensional object using a metal powder containing titanium, the three-dimensional object, a titanium-containing intermediate three-dimensional object, and a titanium-containing three-dimensional object.

SUMMARY

The present invention has been achieved to solve the foregoing problem. A method for manufacturing a three-dimensional object according to the present invention includes: a modeling step of modeling an intermediate object by applying a binding fluid to a metal powder containing titanium (hereinafter, referred to as a titanium-containing metal powder); and a sintering step of sintering the intermediate object to produce a three-dimensional object. The modeling step is performed in a vacuum or inert gas atmosphere.

In the method for manufacturing a three-dimensional object according to the present invention, the modeling step is performed in a modeling area. The method includes a curing step of curing the binding fluid included in the intermediate object in a curing area different from the modeling area after the modeling step and before the sintering step, and the curing step is performed in a vacuum or inert gas atmosphere.

In the method for manufacturing a three-dimensional object according to the present invention, a moving path for moving the intermediate object having gone through the modeling step from the modeling area to the curing area is in a vacuum or inert gas atmosphere.

The method for manufacturing a three-dimensional object according to the present invention further includes a metal powder removal step of removing the titanium-containing metal powder adhering to around the intermediate object after the curing step and before the sintering step. The metal powder removal step is performed in a vacuum or inert gas atmosphere.

In the method for manufacturing a three-dimensional object according to the present invention, the metal powder removal step is performed in a powder removal area different from the curing area, and a moving path for moving the intermediate object having gone through the curing step from the curing area to the powder removal area is in a vacuum or inert gas atmosphere.

In the method for manufacturing a three-dimensional object according to the present invention, the modeling step includes measuring an oxygen concentration in the atmosphere.

In the method for manufacturing a three-dimensional object according to the present invention, the titanium-containing metal powder has an average particle diameter $D_{50}$ of 45 μm or less.

In the method for manufacturing a three-dimensional object according to the present invention, the titanium-containing metal powder has an average particle diameter $D_{50}$ of 40 μm or less.

In the method for manufacturing a three-dimensional object according to the present invention, the titanium-containing metal powder has an average particle diameter $D_{50}$ of 25 μm or more.

In the method for manufacturing a three-dimensional object according to the present invention, the titanium-containing metal powder has an average particle diameter $D_{50}$ of 40 μm or more.

In the method for manufacturing a three-dimensional object according to the present invention, the intermediate object after the curing step and before the sintering step has a density of 2.0 g/cm$^3$ or higher.

In the method for manufacturing a three-dimensional object according to the present invention, the intermediate object after the curing step and before the sintering step has a density of 2.2 g/cm$^3$ or higher.

In the method for manufacturing a three-dimensional object according to the present invention, the intermediate object after the curing step and before the sintering step has a density of 2.5 g/cm$^3$ or higher.

In the method for manufacturing a three-dimensional object according to the present invention, the three-dimensional object after the sintering step has a density of 3.5 g/cm$^3$ or higher.

In the method for manufacturing a three-dimensional object according to the present invention, the three-dimensional object after the sintering step has a density of 3.75 g/cm$^3$ or higher.

In the method for manufacturing a three-dimensional object according to the present invention, the three-dimensional object after the sintering step has a density of 4.0 g/cm$^3$ or higher.

In the method for manufacturing a three-dimensional object according to the present invention, the titanium-containing metal powder has an average particle diameter $D_{50}$ of 40 μm or less, the intermediate object after the curing step and before the sintering step has a density of 2.5 g/cm$^3$ or higher, and the three-dimensional object after the sintering step has a density of 4.0 g/cm$^3$ or higher.

In the method for manufacturing a three-dimensional object according to the present invention, the titanium-containing metal powder has an average particle diameter $D_{50}$ of 40 μm or more, the intermediate object after the curing step and before the sintering step has a density of 2.5 g/cm$^3$ or higher, and the three-dimensional object after the sintering step has a density of 4.0 g/cm$^3$ or higher.

In the method for manufacturing a three-dimensional object according to the present invention, the three-dimensional object after the sintering step contains 0.06% or less by weight of carbon with reference to the weight of the three-dimensional object.

In the method for manufacturing a three-dimensional object according to the present invention, the modeling step includes: a metal powder layer forming step of forming a metal powder layer by supplying the titanium-containing metal powder to an area of flat shape; and a binding fluid application step of applying the binding fluid to a partial area of the metal powder layer based on a planar shape of a layer (hereinafter, referred to as a three-dimensional modeling side layer) among a plurality of three-dimensional modeling side layers into which the three-dimensional object is divided along a predetermined direction, whereby the titanium-containing metal powder in the partial area is bound to form a layer (hereinafter, referred to as an intermediate modeling side layer) of the intermediate object. The metal powder layer forming step and the binding fluid application step are repeated in order, whereby the intermediate modeling side layers are stacked in succession to form the intermediate object.

In the method for manufacturing a three-dimensional object according to the present invention, the inert gas contains at least either nitrogen or a rare gas.

A three-dimensional object according to the present invention is manufactured by the foregoing manufacturing method.

A three-dimensional object according to the present invention is the three-dimensional object manufactured by the foregoing method for manufacturing a three-dimensional object. A surface layer neighboring area including a topmost three-dimensional modeling side layer of the three-dimensional object stacked in the modeling step has a porosity higher than that of a core area inside.

A three-dimensional object according to the present invention is the three-dimensional object manufactured by the foregoing method for manufacturing a three-dimensional object. The three-dimensional object has a slope inclined with respect to a stacking direction of the plurality of three-dimensional modeling side layers at a surface. The slope includes steps between adjoining ones of the three-dimensional modeling side layers, the steps being formed in a continuous staircase pattern along an inclined direction. The steps are stacking traces indicating borders between the adjoining ones of the three-dimensional modeling side layers.

A titanium-containing intermediate three-dimensional object according to the present invention is a titanium-containing intermediate three-dimensional object that is three-dimensionally modeled by application of a binding fluid to a metal powder containing titanium (hereinafter, referred to as a titanium-containing metal powder), cured, and yet to be sintered. The titanium-containing intermediate three-dimensional object has a density of 2.0 g/cm$^3$ or higher.

A titanium-containing three-dimensional object according to the present invention is a titanium-containing three-dimensional object that is three-dimensionally modeled by application of a binding fluid to a metal powder containing titanium (hereinafter, referred to as a titanium-containing metal powder), cured, and sintered. The titanium-containing three-dimensional object has a density of 3.5 g/cm$^3$ or higher.

A titanium-containing three-dimensional object according to the present invention is a titanium-containing three-dimensional object that is three-dimensionally modeled by application of a binding fluid to a metal powder containing titanium (hereinafter, referred to as a titanium-containing metal powder), cured, and sintered. The titanium-containing three-dimensional object contains 0.06% or less by weight of carbon with reference to the weight of the three-dimensional object.

A titanium-containing three-dimensional object according to the present invention is a titanium-containing three-dimensional object that is three-dimensionally modeled by application of a binding fluid to a metal powder containing titanium (hereinafter, referred to as a titanium-containing metal powder), cured, and sintered. A surface layer neighboring area of the three-dimensional object has a porosity higher than that of a core area inside.

Advantageous Effects of Invention

The method for manufacturing a three-dimensional object according to the present invention can provide an excellent effect of enabling modeling of a three-dimensional object using a metal powder containing titanium.

BRIEF DESCRIPTION OF THE DRAWINGS

FIGS. 3A to 3D are schematic diagrams for describing an example of the three-dimensional object manufacturing method according to the present invention, arranged in a time-series order.

FIGS. 4A to 4D are schematic diagrams for describing an example of the three-dimensional object manufacturing method according to the present invention, arranged in a time-series order.

DETAILED DESCRIPTION

Figure 1:
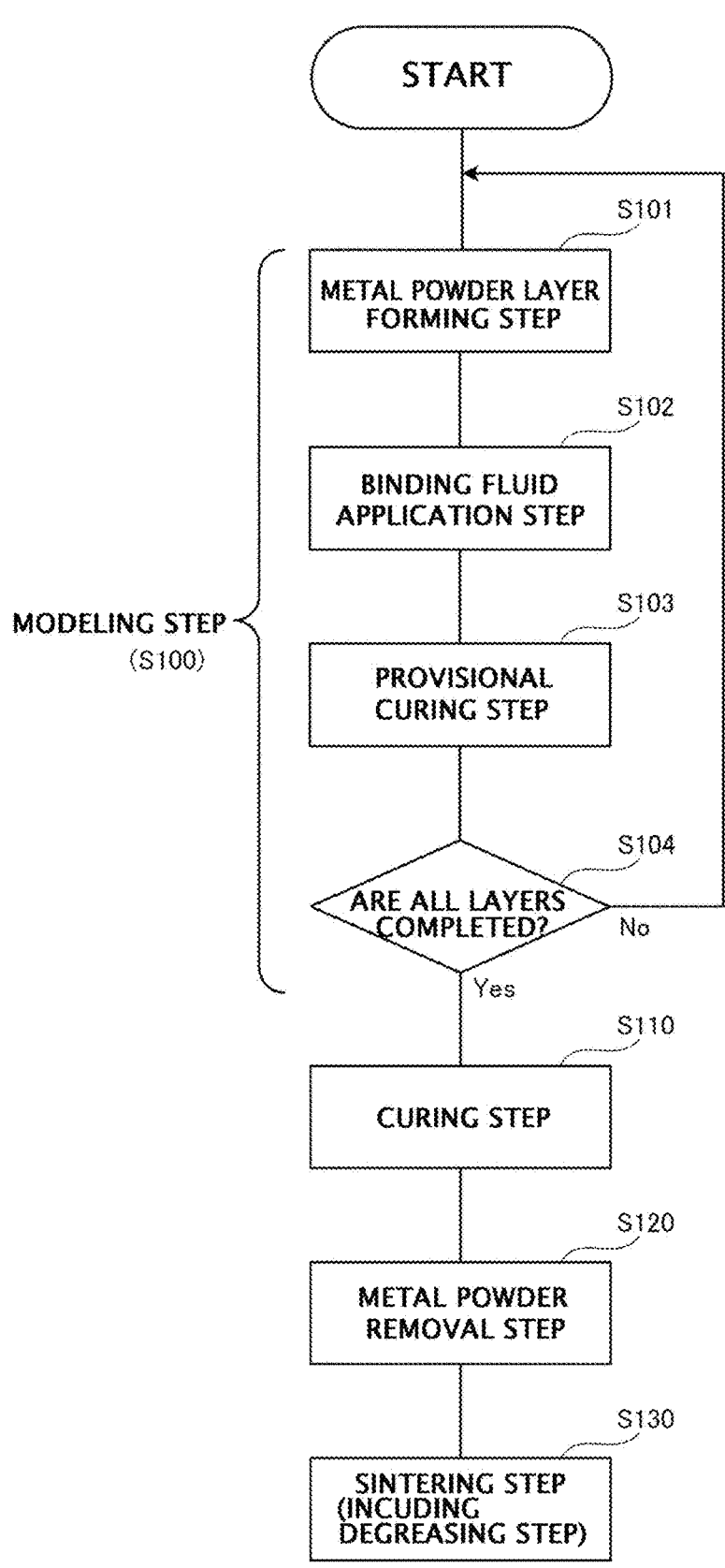
FIG. 1 is a flowchart of a three-dimensional object manufacturing method according to the present invention.

An embodiment of the present invention will be described below with reference to the accompanying drawings. FIGS. 1 to 7 show an example of a mode for carrying out the invention. In the drawings, portions denoted by the same reference numerals as in FIG. 3 represent the same things. <Configuration of Method for Manufacturing Three-Dimensional>

In a method for manufacturing a three-dimensional model according to the embodiment of the present invention, an intermediate object 100 (see FIG. 2A) is initially formed using a metal powder containing titanium (hereinafter, referred to as a titanium-containing metal powder). A final three-dimensional object 200 (see FIG. 2B) is formed from the intermediate object 100. As employed herein, the intermediate object 100 is an incomplete three-dimensional object containing titanium, and in that sense, may be referred to as a titanium-containing intermediate three-dimensional object 100 as appropriate. The three-dimensional object 200, in the sense of being a three-dimensional object containing titanium, may be referred to as a titanium-containing three-dimensional object 200 as appropriate. The method for manufacturing a three-dimensional object according to the present embodiment will hereinafter be described in detail. As shown in FIG. 1, the method for manufacturing a three-dimensional object according to the present embodiment includes a modeling step (S100), a curing step (S110), a metal powder removal step (S120), and a sintering step (S130).
<Modeling Step>

In the modeling step, the intermediate object 100 is modeled in a modeling area, using a titanium-containing metal powder. The titanium-containing metal powder may be a powder consisting only of particles of pure titanium (pure titanium particles). The titanium-containing metal powder may be a powder consisting of metal particles that contain a metal or metals other than titanium but consist mainly of titanium (primary titanium-containing metal particles). The titanium-containing metal powder may be a metal powder consisting of metal particles that contain titanium but consist mainly of a metal other than titanium (secondary titanium-containing metal particles). The titanium-containing metal powder may include titanium-free metal particles (non-titanium metal particles) aside from the foregoing pure titanium particles, primary titanium-containing metal particles, or secondary titanium-containing metal particles. Moreover, the titanium-containing metal powder may be included particles other than those of metal (non-metal particles). If non-titanium metal particles are included, the entire powder may consist mainly of a non-titanium metal. If non-metal particles are included, the entire powder may consist mainly of a non-metal component.

Moreover, the titanium-containing metal powder preferably has an average particle diameter $D_{50}$ of 60 μm or less, more preferably 45 μm or less, and even more preferably 40 μm or less. The average particle diameter $D_{50}$ of the titanium-containing metal powder is also preferably 20 μm or more, more preferably 25 μm or more, and even more preferably 40 μm or more. Consequently, the titanium-containing metal powder preferably has an average particle diameter $D_{50}$ within the range of 20 to 60 μm, more preferably within the range of 20 to 45 μm, and even more preferably within the range of 20 to 40 μm. As employed herein, the average particle diameter $D_{50}$ refers to the particle diameter at which the cumulative volume is 50% on the cumulative curve that represents the particle diameter distribution on a volume basis, obtained by taking the total volume of the population of powders to be measured as 100%, and is also referred to as median diameter. Specifically, the average particle diameter $D_{50}$ is measured by a measurement device using the laser diffraction and scattering method. Modeling using such a titanium-containing metal powder of small average particle diameter $D_{50}$ can produce the intermediate object 100 or a three-dimensional object, to be described below, at high density. Meanwhile, because of the small average particle diameter DSO, the particles tend to scatter and suspend in the surrounding atmosphere during the modeling step. However, since the modeling is performed in a vacuum or inert gas atmosphere as will be described below, the risk of dust explosion and the like can be reduced as well. In the interest of improved manufacturing efficiency, the titanium-containing metal powder preferably has an average particle diameter $D_{50}$ of 40 μm or more, more preferably 50 μm or more, and even more preferably 60 μm or more. The large average particle diameter $D_{50}$ enables quick permeation of a binding fluid to be described below.

Figure 2A:
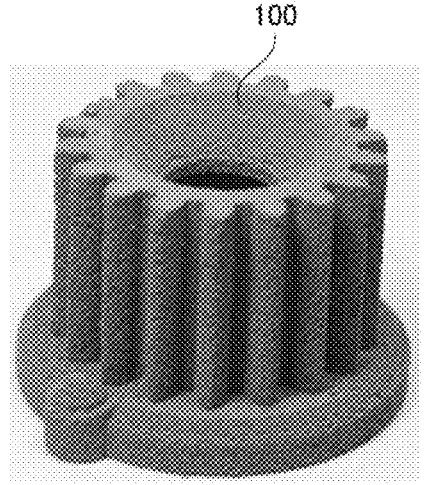
FIG. 2A is a photograph of an intermediate object manufactured by the three-dimensional object manufacturing method according to the present invention.
Figure 2B:
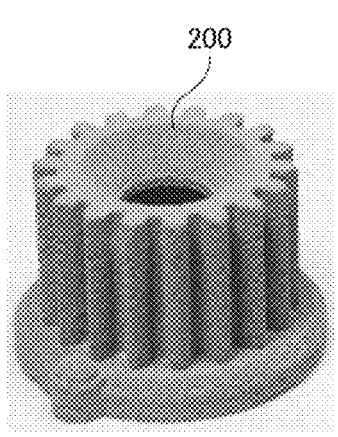
FIG. 2B is a photograph of a three-dimensional object manufactured by the three-dimensional object manufacturing method according to the present invention.

The intermediate object 100 shown in FIG. 2A is a solid body produced in the modeling step. By contrast, the three-dimensional object 200 shown in FIG. 2B is a solid body obtained by sintering the intermediate object 100. As shown in FIGS. 2A and 2B, the three-dimensional object 200 according to the present embodiment is a reduced form of the intermediate object 100.

Titanium-containing metal powder poses a risk of ignition due to, for example, static electricity charged by the surroundings. If the titanium-containing metal powder is scattered in the atmosphere during the modeling step and the titanium-containing metal power in such a state is in an oxygen atmosphere, combustion of the titanium-containing metal powder that ignites in the atmosphere is promoted, possibly causing a dust explosion. By contrast, if the atmosphere during the modeling step is filled with nitrogen gas, an inert gas, combustion of the titanium-containing metal powder that is scattered and suspended in the atmosphere is suppressed, precluding a dust explosion. In the present embodiment, the modeling step is thus preferably performed in a nitrogen gas atmosphere. Specifically, the modeling area where the titanium-containing metal powder is supplied is preferably surrounded by a cover and put in a nitrogen gas atmosphere.

The inert gas to fill the atmosphere of the modeling step may be a gas other than nitrogen. Examples of the inert gas other than nitrogen may include a rare gas such as argon. In other words, the "atmosphere filled with an inert gas" preferably has an oxygen concentration ratio of 1.0% or less in the atmosphere, more preferably 0.5% or less, and even more preferably 0.1% or less. The oxygen concentration in the atmosphere is preferably measured by an oxygen concentration measurement unit (not shown) constantly or at regular intervals while the process for modeling the intermediate object 100 is performed in the modeling step (S100). The measurement of the oxygen concentration in the modeling step (S100) is preferably employed in the curing step (S110) and the metal powder removal step (S120) in a similar manner.

Next, details of the modeling step will be described. Here, a case where the modeling step is implemented by binder jetting will be described. However, this is not restrictive, and the modeling step may be implemented by other three-dimensional object modeling methods. As shown in FIG. 1, in the present embodiment, the modeling step includes a metal powder layer forming step (S101), a binding fluid application step (S102), and a provisional curing step (S103). In the present embodiment, the modeling step is performed by a modeling apparatus 1 shown in FIG. 3A.

As shown in FIG. 3A, the modeling apparatus 1 includes a modeling tank 10 having a recess 11 with an upward-facing opening 111, an accommodation unit 12 that accommodates metal powder and supplies the metal powder downward, a roller 13, a binding fluid discharge unit 14 including a nozzle 140 for discharging a binding fluid, a heating unit 15, a vibration unit 16, a relative movement unit (not shown), and a lifting unit (not shown). A stage 17 constituting the bottom of the recess 11 of the modeling tank 10 is lifted up and down in the depth direction of the recess 11 by the lifting unit. As a result, the depth of the recess 11 can be adjusted while maintaining the width and depth of the recess 11 by the lifting operation of the stage 17 to vertically extend or reduce the space above the stage 17 in the recess 11. The space in the recess 11 forms a modeling area V where the intermediate object 100 is formed. The modeling apparatus 1 includes a modeling space K that includes the modeling area V and that also surrounds the accommodation unit 12, the roller 13, and the binding fluid discharge unit 14 above.

In the present embodiment, the modeling area V, as a minimum, is filled with the inert gas to reduce the risk of dust explosion due to the titanium-containing metal powder in the modeling apparatus 1. The modeling space K is preferably filled with the inert gas. The modeling area V or the modeling space K is put in an inert gas atmosphere preferably by providing a cover surrounding the modeling area V or the modeling space K. The modeling area V or the modeling space K is separated from the outside space by the cover.

The accommodation unit 12 includes a mesh unit 120 in its lower part. In the present embodiment, the mesh unit 120 preferably has an opening size (a mesh size) in the range of 100 to 200 μm, more preferably in the range of 130 to 160 μm. The vibration unit 16 applies vibrations to the mesh unit 120 or the accommodation unit 12. This vibration can cause the metal powder accommodated in the accommodation unit 12 to pass through the mesh unit 120 and fall down. The vibration unit 16 is assumed to be constituted by an ultrasonic oscillator that applies ultrasonic vibrations to the mesh unit 120, for example. However, this is not restrictive, and other members may be used. Moreover, the accommodation unit 12 may include an opening (not shown) for supplying the metal powder to outside and an on-off valve (not shown) that opens and closes the opening. The mesh unit 120 may be equipped with an on-off valve (not shown).

The relative movement unit horizontally moves the accommodation unit 12, the roller 13, the binding fluid discharge unit 14, and the heating unit 15 each relative to the modeling tank 10. As shown in FIG. 3A, in the present embodiment, the accommodation unit 12, the roller 13, and the vibration unit 16 are coupled to each other. As employed herein, this assembly will be referred to as the recoater as appropriate. The heating unit 15 is also coupled to the recoater. The recoater (accommodation unit 12, roller 13, and vibration unit 16) and the heating unit 15 are thus integrally moved by the relative movement unit. While these units are shown to be moved relative to the modeling tank 10 in one axial direction, such as a moving direction A or B, that is a horizontal direction in FIGS. 3 and 4 and a direction orthogonal to the moving directions A and B. However, these units may be moved relative to the modeling tank in two axial directions constituting a plane. FIGS. 3B to 3D and 4A to 4D show only necessary portions of the modeling apparatus 1, and the rest are omitted. Note that a configuration where the recoater and the heating unit 15, or the accommodation unit 12, the roller 13, and the heating unit 15, make relative movements independent of each other is also included in the scope of the present invention.

<Metal Powder Layer Forming Step>

In the metal powder layer forming step S101, the titanium-containing metal powder is supplied to the modeling area V in the recess 11 of the modeling tank 10 of the modeling apparatus 1 to form a flat-surfaced second metal powder layer 23. In FIG. 3A, a first layer 101 of the intermediate object 100 is already formed in a first metal powder layer 21 in the recess 11 of the modeling tank 10 by the previous modeling step. As employed herein, each of a plurality of layers comprising the intermediate object 100, including the first layer 101, may be referred to as an intermediate modeling side layer. In this state, the stage 17 is lowered so that the top surface of the first layer 101 is located lower than the opening 111 of the recess 11 in a depth direction D of the recess 11. As a result, an accommodation area 112 capable of accommodating the newly supplied titanium-containing metal powder is formed between the top surface of the first layer 101 and the opening 111 of the recess 11 in the modeling area V of the recess 11. The accommodation area 112 is a unit area of one layer when the modeling area V is divided into layers along the depth direction D of the modeling area V (recess 11). The accommodation area 112 has a thickness in the range of 30 to 200 μm or so, for example. The accommodation area 112 can thus be regarded as an area of flat shape. The modeling tank 10 and the stage 17 are transportable and configured to also serve as a conveyance container for subsequent steps.

Next, as shown in FIG. 3B, the relative movement unit moves the recoater from one end of the recess 11 to the other in the moving direction A, with the recoater located above (directly above) the recess 11 along the moving direction A, which is parallel to the opening 111 of the recess 11. Here, the roller 13 is located at a position behind the mesh unit 120 in the traveling direction of the recoater (moving direction A) and where the bottom end of the peripheral surface of the roller 13 positionally coincides with the top end (opening 111) of the recess 11 in the depth direction D of the modeling area V (recess 11). The moving direction A is a direction orthogonal to the depth direction D of the recess 11. For example, the moving direction A refers to a direction parallel to a predetermined side of the recess 11 when the recess 11 is seen in a plan view (horizontal direction in FIG. 3B). While the accommodation unit 12 moves from one end of the recess 11 to the other while being located above (directly above) the recess 11, the vibration unit 16 applies vibrations to the mesh unit 120. As a result, as shown in FIG. 3B, the titanium-containing metal powder 20 passes through the mesh unit 120 and falls on the accommodation area 112 in a line shape (curtain shape) extending in the front-to-back direction in FIG. 3B (depth direction to the plane of FIG. 3B), whereby the titanium-containing metal powder 20 accumulates in the accommodation area 112. Here, the titanium-containing metal powder 20 accumulates, heaping up above the recess 11 (accommodation area 112) beyond the opening 111. The area filled with the titanium-containing metal powder 20 up to the opening 111 will be referred to as a filled powder area 22A as appropriate. The area where the titanium-containing metal powder heaps up above the recess 11 (filled powder area) beyond the opening 111 will be referred to as an excessive powder area 22B as appropriate.

When the mesh unit 120 has passed the other end of the recess 11, the vibration of the vibration unit 16 is stopped, whereby the falling of the titanium-containing metal powder 20 from the mesh unit 120 is stopped. This stoppage ends the process for supplying the titanium-containing metal powder 20 from the accommodation unit 12 to the accommodation area 112. With the foregoing supply process ended, as shown in FIG. 3C, the roller 13 moves in the moving direction A along with the accommodation unit 12 while being rotated clockwise by a roller driving unit (not shown) to level the excessive powder area 22B. As shown in FIG. 3C, when the roller 13 has passed through, the excessive powder area 22B is leveled off by the roller 13 and is no longer present. Thus, only the filled powder area 22A remains. As shown in FIG. 3D, the foregoing leveling process is performed until the roller 13 reaches the other end of the recess 11. As a result, only the filled powder area 22A remains to form the second metal powder layer 23 in the accommodation area 112. The roller 13 stops rotating when the roller 13 passes the other end of the recess 11. The recoater then travels further in the moving direction A and remains on standby on the left side of the modeling tank 10. In the present embodiment, the foregoing leveling process is started after the end of the foregoing supply process. However, this is not restrictive, and the recoater and the recoater control may be configured so that the leveling process starts when the foregoing supply process is underway, i.e., before the end.

<Binding Fluid Application Step>

In the binding fluid application step S102, a binding fluid (binder) 24 for binding the titanium-containing metal powder 20 is applied to (filled into) a partial area (application area) of the second metal powder layer 23 formed in the metal powder layer forming step S101. The binding fluid 24 is applied to a corresponding area of the second metal powder layer 23 based on the planar shape of a given layer among a plurality of layers into which the desired three-dimensional object 200 is divided along a predetermined direction. As employed herein, each of a plurality of layers comprising the three-dimensional object 200 may be referred to as a three-dimensional modeling side layer to distinguish it from the intermediate modeling side layer of the intermediate object 100. More specifically, the application area of the binding fluid 24 is determined by two-dimensional image data (slice data) that is obtained by dividing three-dimensional data on a three-dimensional object into a plurality of layers in the predetermined direction (here, depth direction D). Herein, the three-dimensional object in the three-dimensional data is enlarged in advance by the amount reduced in the sintering step to be described below (here, the same as the intermediate object 100).

As shown in FIG. 4A, in the present embodiment, the binding fluid discharge unit 14 discharges the binding fluid 24 from above the second metal powder layer 23 to the second metal powder layer 23 through the nozzle 140. The binding fluid discharge unit 14 is relatively moved from its initial position to above (directly above) the second metal powder layer 23 by the relative movement unit, and reciprocated relative to the second metal powder layer 23 between one end of the recess 11 to the other in an orthogonal direction C (depth direction to the plane of FIG. 4A). The orthogonal direction C is parallel to the surface of the second metal powder layer 23 and orthogonal to the moving direction A. Here, the binding fluid discharge unit 14 discharges the binding fluid 24 to the foregoing application area through the nozzle 140. The relative reciprocation of the binding fluid discharge unit 14 may be performed once or a plurality of times. The direction of the relative reciprocation may be a direction parallel to the moving direction A. When the discharge process of the binding fluid 24 by the binding fluid discharging unit 14 ends, the binding fluid discharging unit 14 is restored to the initial position by the relative movement unit. The area to which the binding fluid 24 is applied becomes a second layer 102 of the intermediate object 100. As shown in FIG. 4B, the stage 17 is then lifted down in the depth direction D of the recess 11 by the lifting unit, whereby a new accommodation area 112 is formed in the recess 11.

<Provisional Curing Step>

In the provisional curing step S103, the binding fluid 24 applied to the second metal powder layer 23 is provisionally cured at the location. The provisional curing of the applied binding fluid 24 binds the titanium-containing metal powder 20 included in the second layer 102. In the present embodiment, the binding fluid 24 is a thermosetting binder in which curing is promoted by heating. The heating temperature depends on the thermosetting properties of the binding fluid 24 (binder). An example is 50° C. Using such properties, in the present embodiment, the heating unit 15 heats the second layer 102 to provisionally cure the binding fluid 24 (binder). As described above, the heating unit 15 is on standby on the left side of the modeling tank 10 along with the recoater. In the provisional curing step S103, as shown in FIGS. 4B and 4C, the heating unit and the recoater are moved by the relative movement unit relative to the second metal powder layer 23 from the other end of the recess 11 to one end in the moving direction B opposite the moving direction A, above (directly above) the second metal powder layer 23, and returned to the initial state. As a result, the second metal powder layer 23 is heated to provisionally cure the binding fluid 24, and the second layer 102 of the intermediate object 100 is completed as shown in FIG. 4D. If the binding fluid 24 has a property of immediately curing in a provisional manner without heating, or if natural drying is preferable, the provisional curing step by the heating unit 15 may be omitted.

With the second layer 102 of the intermediate object 100 completed, the method proceeds to a determination step S104 to determine whether all the layers are completed. If a third layer is needed, the method proceeds to NO. The metal powder layer forming step S101 (see FIGS. 3A to 3D), the binding fluid application step S102 (see FIG. 4A), and the provisional curing step S103 (see FIGS. 4B and 4C) are performed in order again, whereby a third layer (not shown) that is an upper layer adjoining the second layer 102 is formed. While the stage 17 is described to be lifted down by the lifting unit in the depth direction D of the recess 11 to form the accommodation area 112 in the recess 11 before the provisional curing step S103 as shown in FIG. 4B, the stage 17 may be lifted down after the provisional curing step S103.

The foregoing processes are repeated to stack the layers of the intermediate object 100 in succession. If all the layers are determined to be completed in the determination step S104 (YES), the method proceeds to the curing step S110.

<Curing Step>

In the curing step S110, the binding fluid included in the intermediate object 100 is fully cured. The curing step is performed in a curing area W (curing space L) (see FIG. 5A) different from the modeling area V (modeling space K). The curing area W is the area where the intermediate object 100 is accommodated and the curing process is performed, and the curing space L refers to a furnace space in a curing furnace (drying furnace) serving as a curing apparatus 25 and includes the curing area W. In the curing process according to the present embodiment, the intermediate object 100 is heated at a predetermined temperature (for example, 200° C.) for a predetermined time. The predetermined temperature of the curing process is preferably 100° C. or higher. The binding fluid 24 included in the intermediate object 100 is thereby dried and fully cured. Depending on the properties of the binding fluid, the curing process may be performed by other methods. On another note, the residual component of the binding fluid included in the intermediate object 100 after the curing step S110 and before the sintering step S130 preferably falls within the range of 1% to 6% in the weight proportion with reference to the intermediate object 100, more preferably within the range of 1% to 4%.

Figure 5A:
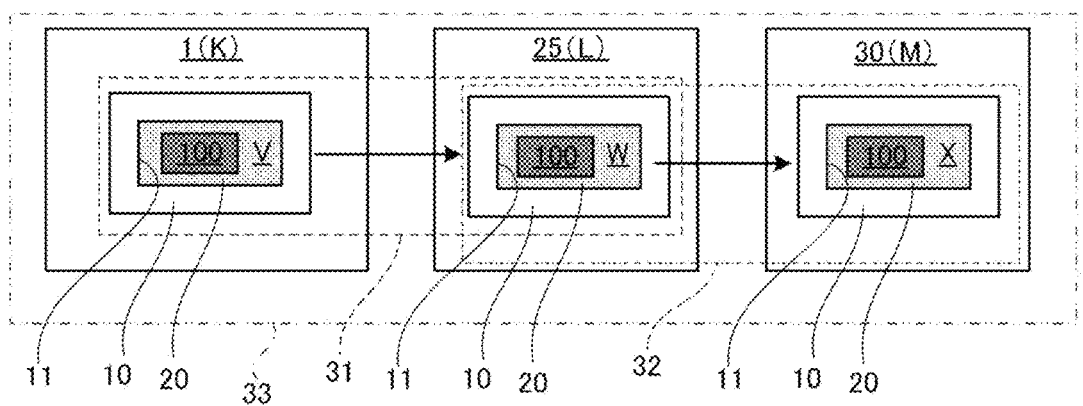
FIG. 5A is a schematic plan view showing a layout of apparatuses that perform the three-dimensional object manufacturing method according to the present invention.
Figure 5B:
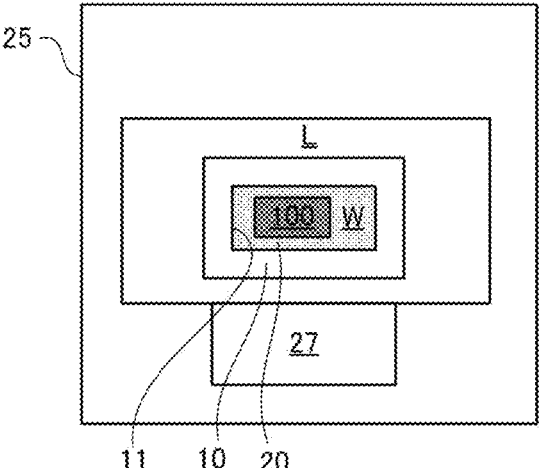
FIG. 5B is a schematic plan view showing a curing apparatus used in a curing step according to the present invention.

As shown in FIGS. 5A and 5B, the transition from the modeling step S100 to the curing step S110 is implemented by moving the modeling tank 10 and the stage 17 used in the modeling apparatus 1 from the modeling apparatus 1 to the curing apparatus along with the intermediate object 100 inside and the uncured titanium-containing metal powder 20 remaining around. As shown in FIG. 5A, in the present embodiment, the modeling tank 10 has the recess 11 for accommodating the intermediate object 100 and the titanium-containing metal powder 20, and is configured to be transportable.

As shown in FIG. 5B, the curing apparatus 25 includes a temperature adjustment unit 27 that can adjust the furnace temperature (temperature of the curing space L) to a temperature at which the water-soluble binding fluid included in the intermediate object 100 can be dried and cured. Examples of the curing apparatus 25 include a constant temperature furnace. However, this is not restrictive, and other devices may be used.

In the present embodiment, there is the titanium-containing metal powder 20 uncured even in the curing area W (curing space L). To eliminate the risk of dust explosion due to the titanium-containing metal powder 20 being scattered, the curing area W (curing space L) is preferably filled with an inert gas. Moreover, in the process of moving the intermediate object 100 and the titanium-containing metal powder 20 accommodated in the modeling tank 10 from the modeling apparatus 1 to the curing apparatus 25, the titanium-containing metal powder 20 tends to scatter. There is therefore the risk of dust explosion of the titanium-containing metal powder 20 due to electrostatic ignition and other causes. As shown in FIG. 5A, a moving path 31 of the modeling tank 10 (area surrounded by the dotted line in FIG. 5A) from the modeling apparatus 1 to the curing apparatus 25 (curing area W) is thus preferably placed in an inert gas atmosphere by provision of a cover surrounding the moving path 31 of the modeling tank 10. The moving path 31 is separated from the outside space by the cover.

<Metal Powder Removal Step>

In the metal powder removal step S120, the uncured titanium-containing metal powder 20 remaining around the intermediate object 100 is removed. As shown in FIG. 5A, the metal powder removal step is performed in a powder removal area X. The powder removal area X is the area where the intermediate object 100 is accommodated and the metal powder removal process is performed. The powder removal area X is a separate area from the modeling area V and the curing area W. A powder removal space M refers to a processing space inside a powder removal apparatus 30 and includes the powder removal area X. As shown in FIG. 5A, the transition from the curing step S110 to the metal powder removal step S120 is implemented by moving the modeling tank 10 and the stage 17 used in the curing apparatus 25 from the curing apparatus 25 to the powder removal apparatus 30 along with the intermediate object 100 inside and the uncured titanium-containing metal powder 20 remaining around. In the powder removal area X, the intermediate object 100 is taken out, and the uncured titanium-containing metal powder 20 adhering to the intermediate object 100 is removed by jetting an inert gas to the intermediate object 100 by using a jet nozzle or a brush.

In removing the titanium-containing metal powder 20 from the intermediate object 100, there is the risk of dust explosion of the scattered titanium-containing metal powder 20 due to electrostatic ignition and other causes. The metal powder removal step S120 is therefore preferably performed in an inert gas atmosphere. In particular, in the present embodiment, the powder removal area X where the powder removal process is performed is preferably in an inert gas atmosphere. The entire powder removal space M is preferably put in an inert gas atmosphere. The titanium-containing metal powder 20 removed in the metal powder removal step S120 is collected and reused to form three-dimensional objects 200.

In the process of moving the modeling tank 10 and the stage 17 from the curing apparatus 25 (curing area W) to the powder removal area X where the metal powder removal step is performed, the titanium-containing metal powder 20 tends to scatter. There is therefore the risk of dust explosion of the titanium-containing metal powder 20 due to electrostatic ignition and other causes. A moving path 32 of the modeling tank 10 and the like (area surrounded by a dot-dashed line in FIG. 5A) from the curing apparatus 25 to the powder removal apparatus 30 is therefore preferably placed in an inert gas atmosphere by provision of a cover surrounding the moving path 32 of the modeling tank 10 and the like. The moving path 32 is separated from the outside space by the cover.

As described in the foregoing respective steps, to eliminate the risk of dust explosion, the foregoing respective steps (modeling step, curing step, and metal powder removal step) and the moving paths 31 and 32 therebetween are preferably in an inert gas atmosphere constantly and as much as possible while the uncured titanium-containing metal powder 20 is present. The entire area 33 including the modeling apparatus 1, the curing apparatus 25, and the powder removal apparatus 30 (see FIG. 5A) may be collectively put in an inert gas atmosphere. The respective steps may use the same type or different types of inert gas.

While the case of putting the spaces in an inert gas atmosphere is described above, all or part of the spaces may be put in a vacuum environment (vacuum atmosphere). As employed in the present invention, the vacuum environment (vacuum atmosphere) preferably has an oxygen concentration of 1.0% or less, more preferably 0.5% or less, and even more preferably 0.1% or less. The vacuum environment may be constructed by providing vacuum chambers in the respective spaces (respective areas) and sucking out the air using vacuum pumps.

<Sintering Step>

In the sintering step S130, the intermediate object 100 having gone through the metal powder removal step S120 is sintered to produce the three-dimensional object 200. For example, in the present embodiment, the intermediate object 100 is put in a vacuum sintering furnace and sintered. The sintering temperature is preferably in the range of 1000° C. to 1400° C., more preferably 1200° C. to 1400° C., for example. In this process, the sintering step includes a degreasing step of evaporating and removing the binding fluid 24 (binder) already cured in the intermediate object 100.

With the intermediate object 100 sintered, the particles constituting the intermediate object 100 are bound to each other. The entire intermediate object 100 shrinks into the three-dimensional object 200. The density of the three-dimensional object 200 can be increased by increasing the sintering temperature. The sintering temperature is thus determined with these effects taken into consideration.

<Three-Dimensional Object>

Figure 6A:
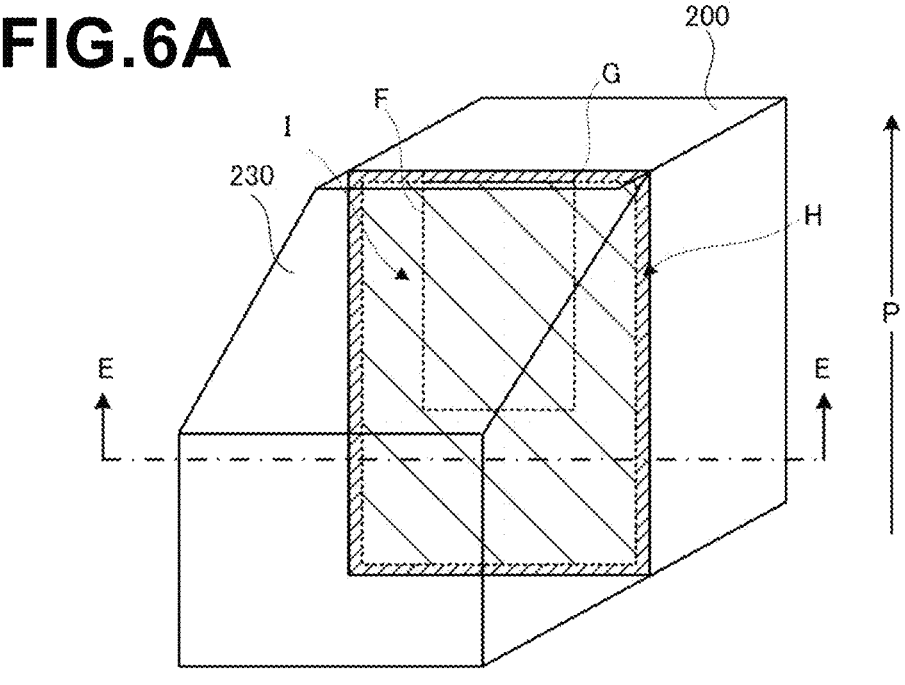
FIG. 6A is a perspective view of a three-dimensional object manufactured by the three-dimensional object manufacturing method according to the present invention.
Figure 6B:
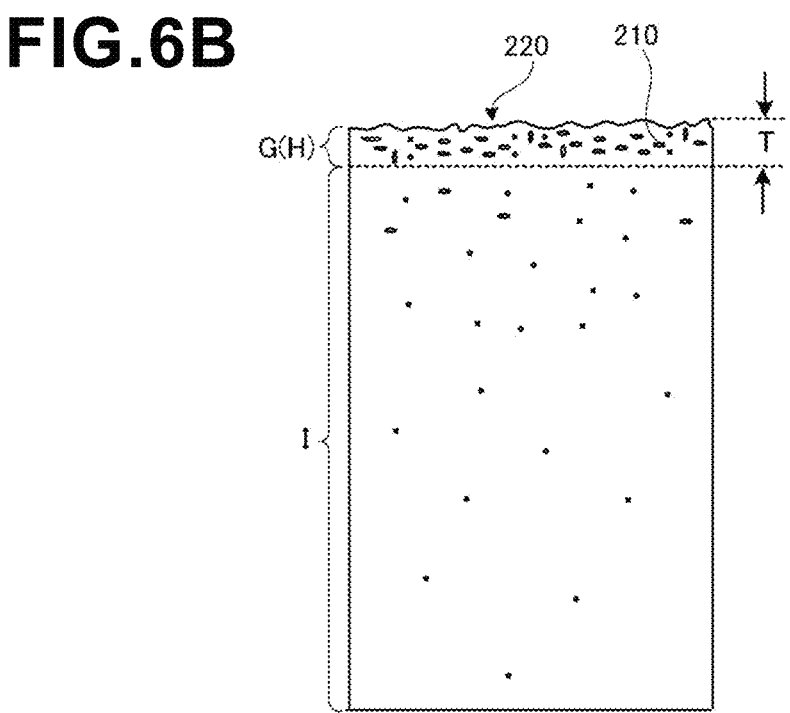
FIG. 6B is an enlarged schematic view of a dotted-lined area F in an E-E cross section of FIG. 6A.

The three-dimensional object 200 will be described with reference to FIGS. 6 and 7. The three-dimensional object 200 in FIGS. 6 and 7 is one formed along a stacking direction P. FIG. 6B shows an enlarged schematic view of a dotted-lined area F in an E-E cross section of the three-dimensional object 200 of FIG. 6A taken along the stacking direction P. A plurality of small areas in the schematic diagram shown in FIG. 6B are pores 210 formed in the three-dimensional object 200.

As is clear from FIG. 6B, a surface layer neighboring area H, adjacent to the entire surface of the three-dimensional object 200 (see the outer diagonal-lined area in FIG. 6A) including a topmost layer G of the three-dimensional object 200 (area above the dotted line) that is stacked in the modeling step S100, includes more pores per unit volume than a core area I (see the inner diagonal-lined area in FIG. 6A) of the three-dimensional object 200 inside the surface layer neighboring area H. The surface layer neighboring area H also has a higher porosity than that of the core area I. The porosity refers to the volume ratio of the pores in a reference area (surface layer neighboring area H or core area I) included in the three-dimensional object 200. The porosity can be expressed by (the volume of the pores/the volume of the reference area (surface layer neighboring area H or core area I) included in the three-dimensional object 200). In other words, the porosity in the surface layer neighboring area H can be expressed by (the volume of the pores in the surface layer neighboring area H/the volume of the surface layer neighboring area H). The porosity in the core area I can be expressed by (the volume of the pores in the core area I/the volume of the core area I). In the process of sintering the intermediate object 100 in the sintering step S130, the binding fluid 24 (binder) in each area of the intermediate object 100 moves outside through the surface of the three-dimensional object 200. Since the binding fluid 24 (binder) in each area of the intermediate object 100 passes through the surface layer neighboring area H of the intermediate object 100, the density of the binding fluid 24 (binder) per unit volume in the surface layer neighboring area H of the intermediate object 100 during the sintering step is higher than in the other areas. Therefore, in the surface layer neighboring area H of the intermediate object 100, many of the particles constituting the intermediate object 100 are bound to each other with a gap therebetween. As a result, more pores 210 are formed in the surface layer neighboring area H of the three-dimensional object 200 than in the other areas. Many pits and projections 220 are also formed at the surface of the three-dimensional object 200.

The surface layer neighboring area H of the three-dimensional object 200 includes not only the topmost layer of the intermediate object 100 that is stacked last in the modeling step S100 according to the present embodiment but all the other areas near the surface layer of the three-dimensional object 200. The depth (thickness) of the surface layer neighboring area H of the three-dimensional object 200 may be the same as or different from the depth (thickness) T of the topmost layer G of the three-dimensional object 200. In FIG. 6, the depth (thickness) of the surface layer neighboring area H of the three-dimensional object 200 is the same as the depth (thickness) T of the topmost layer G of the three-dimensional object 200.

Figure 7A:
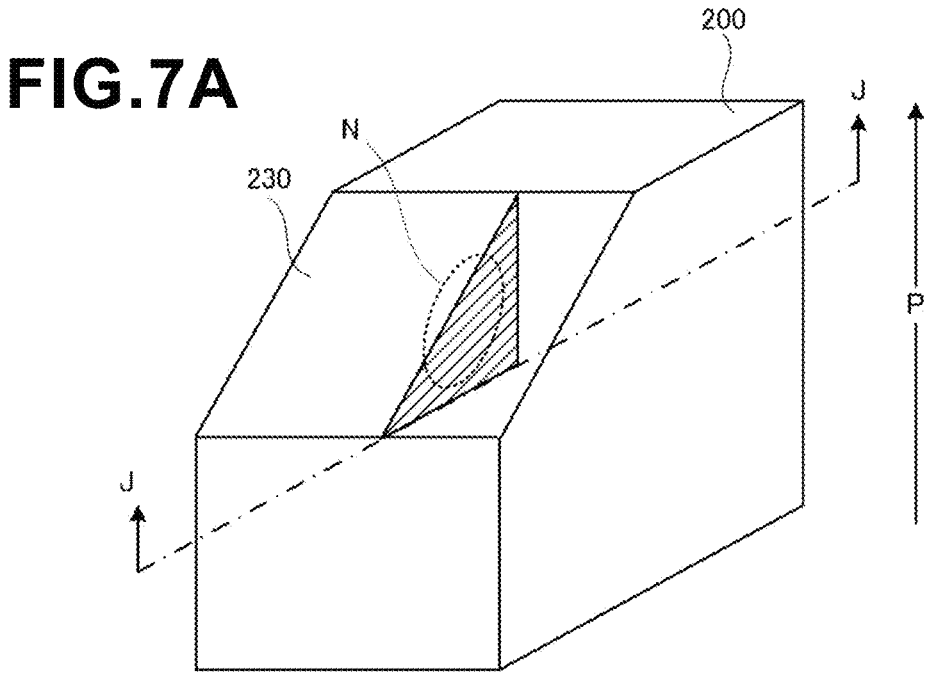
FIG. 7A is a perspective view of a three-dimensional object manufactured by the three-dimensional object manufacturing method according to the present invention.
Figure 7B:
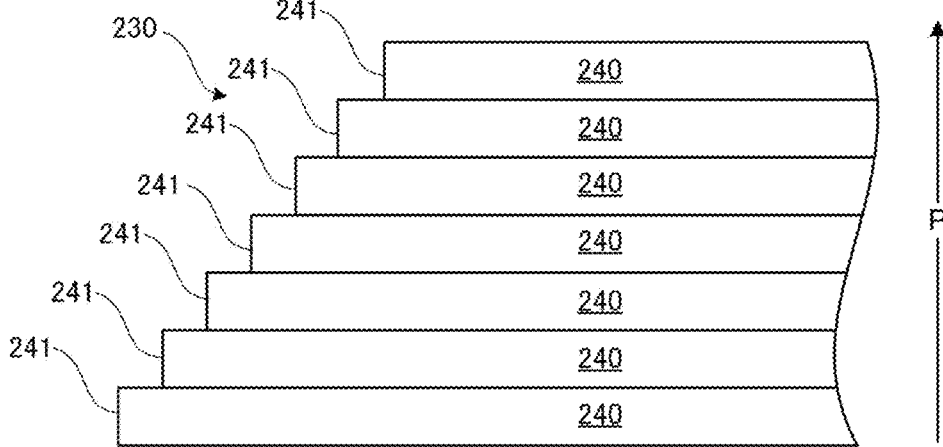
FIG. 7B is an enlarged schematic view of a dotted-lined area N in a J-J cross section of FIG. 7A.

Stacking traces indicating the borders of the adjoining layers appear in a slope 230 of the three-dimensional object 200 after the three-dimensional object 200 has gone through the modeling step S100 according to the present embodiment. For the sake of description, FIG. 7B shows an enlarged schematic view of a dotted-lined area N including the slope 230 in a J-J cross section of the three-dimensional object 200 of FIG. 7A taken along the stacking direction P. As shown in FIG. 7B, the slope 230 of the three-dimensional object 200 is inclined with respect to the stacking direction P. The slope 230 of the three-dimensional object 200 is not a smooth slope. Adjoining layers 240 stacked in the modeling step S100 according to the present embodiment have steps formed in a continuous staircase pattern along the inclined direction of the slope 230. In other words, the respective layers 240 of the three-dimensional object 200 are formed so that end faces 241 of the adjoining layers 240 are located at different positions, producing steps between the adjoining layers 240. The steps form the stacking traces of the three-dimensional object 200.

Embodiment 1

The inventor of the present application formed three-dimensional objects from a titanium-containing metal powder, using a 3D printer employing binder jetting. Here, the inventor formed a first three-dimensional object using a pure titanium powder consisting of titanium as the titanium-containing metal powder, and a second three-dimensional object using a 64 titanium powder consisting of Ti64 (Ti-6Al-4V) as the titanium-containing metal powder. The first three-dimensional object and the second three-dimensional object had the same shape and size. The pure titanium powder and 64 titanium powder having particle diameters in the particle size range of 45 μm or less and an average particle diameter $D_{50}$ of 30 μm were used. The accommodation unit of the foregoing 3D printer apparatus used a mesh unit having an opening size of approximately 150 μm. The sintering temperature in the sintering step was 1200° C.

The inventor of the present application measured the densities of the first three-dimensional object and the second three-dimensional object having gone through the sintering step, and the densities of a first intermediate object corresponding to the first three-dimensional object and having gone through the curing step and a second intermediate object corresponding to the second three-dimensional object and having gone through the curing step. As a result, the density of the first intermediate object was 2.55 g/cm³. The density of the second intermediate object was 2.55 g/cm³. The density of the first three-dimensional object was 4.24 g/cm³. The density of the second three-dimensional object was 4.16 g/cm³. From the foregoing results, the intermediate objects having gone through the curing step are found to have a density less than or equal to 2.6 g/cm³, and the three-dimensional objects are found to have a density greater than or equal to 4.0 g/cm³. As a result, it was confirmed that high density three-dimensional objects can be manufactured using the pure titanium powder and 64 titanium powder with an average particle diameter $D_{50}$ of 30 μm. The residual components of the binding fluid included in the intermediate objects after the curing step and before the sintering step were as much as 3.5% or so in the weight proportion with reference to the intermediate objects after the curing step and before the sintering step.

Considering the foregoing results, the density of the intermediate object 100 after the curing step and before the sintering step is preferably 2.0 g/cm³ or higher, more preferably 2.2 g/cm³ or higher, and even more preferably 2.5 g/cm³ or higher. The density of the three-dimensional object 200 after the sintering step is preferably 3.5 g/cm³ or higher, more preferably 3.75 g/cm³ or higher, and even more preferably 4.0 g/cm³ or higher. The titanium-containing metal powder that is the material of such an intermediate object 100 and three-dimensional object 200 preferably has an average particle diameter $D_{50}$ of 40 μm or less.

The carbon content of the second three-dimensional object with reference to the weight of the second three-dimensional object was 0.0573% by weight. Considering this result, the three-dimensional object 200 preferably has a carbon content of 0.06% or less by weight.

It will be understood that the method for manufacturing a three-dimensional object according to the present invention is not limited to the foregoing embodiment, and various changes can be made without departing from the gist of the present invention.

The invention claimed is:

1. A three-dimensional object manufactured by a method, the method including:

a modeling step of modeling an intermediate object by applying a binding fluid to a titanium-containing metal powder, the modeling step further including:

a metal powder layer forming step of forming a metal powder layer by supplying the titanium-containing metal powder to an area of flat shape; and a binding fluid application step of applying the binding fluid to a partial area of the metal powder layer based on a planar shape of a three-dimensional modeling side layer among a plurality of three-dimensional modeling side layers into which the three-dimensional object is divided along a predetermined direction, whereby the titanium-containing metal powder in the partial area is bound to form an intermediate modeling side layer of the intermediate object; and a sintering step of sintering the intermediate object to produce the three-dimensional object, wherein the modeling step is performed in a vacuum or inert gas atmosphere, the metal powder layer forming step and the binding fluid application step are repeated in order, whereby the intermediate modeling side layers are stacked in succession to form the intermediate object, the three-dimensional object comprising:

a surface layer neighboring area including a topmost three-dimensional modeling side layer of the three-dimensional object stacked in the modeling step has a porosity higher than that of a core area in an inside of the three-dimensional object; and multiple pits and projections at a surface of the three-dimensional object.

2. The three-dimensional object according to claim 1, wherein the three-dimensional object has a slope inclined with respect to a stacking direction of the plurality of three-dimensional modeling side layers at the surface of the three-dimensional object, the slope includes steps between adjoining ones of the three-dimensional modeling side layers, and the steps are formed in a continuous staircase pattern along an inclined direction, and the steps are stacking traces indicating borders between the adjoining ones of the three-dimensional modeling side layers.

3. A titanium-containing three-dimensional object that is three-dimensionally modeled by application of a binding fluid to a metal powder containing titanium, cured, and sintered, the titanium-containing three-dimensional object comprising:

a density of 3.5 g/cm³ or higher; and multiple pits and projections at a surface of the titanium-containing three-dimensional object.

4. A titanium-containing three-dimensional object that is three-dimensionally modeled by application of a binding fluid to a metal powder containing titanium, cured, and sintered, the titanium-containing three-dimensional object comprising:

0.06% or less by weight of carbon that is contained in the titanium-containing three-dimensional object with reference to a weight of the titanium-containing three-dimensional object; and multiple pits and projections at a surface of the titanium-containing three-dimensional object.

5. A titanium-containing three-dimensional object that is three-dimensionally modeled by application of a binding fluid to a metal powder containing titanium, cured, and sintered, the titanium-containing three-dimensional object comprising:

a surface layer neighboring area of the titanium-containing three-dimensional object having a porosity higher than that of a core area in an inside of the titanium-containing three-dimensional object; and multiple pits and projections at a surface of the titanium-containing three-dimensional object.

* * * * *